US008523227B2

(12) United States Patent
Roach

(10) Patent No.: US 8,523,227 B2
(45) Date of Patent: Sep. 3, 2013

(54) SINGLE POINT FRICTION LOCK FOR TILT AND TELESCOPE ADJUSTMENT OF STEERING COLUMNS

(75) Inventor: Keegan Roach, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 232 days.

(21) Appl. No.: 12/966,433

(22) Filed: Dec. 13, 2010

(65) Prior Publication Data
US 2012/0146316 A1   Jun. 14, 2012

(51) Int. Cl.
*B62D 1/184* (2006.01)
*B62D 1/187* (2006.01)

(52) U.S. Cl.
USPC ............... 280/775; 280/779; 74/492; 74/493

(58) Field of Classification Search
USPC ............................ 280/775, 779; 74/492, 493
See application file for complete search history.

(56) References Cited

U.S. PATENT DOCUMENTS

| 3,691,866 | A | * | 9/1972 | Berkes ............................. 74/493 |
|---|---|---|---|---|
| 4,449,419 | A | * | 5/1984 | Soler Bruguera ............... 74/493 |
| 4,656,888 | A |  | 4/1987 | Schmitz |
| 5,160,165 | A | * | 11/1992 | Hoblingre ..................... 280/775 |
| 5,165,720 | A | * | 11/1992 | Hoblingre ..................... 280/775 |
| 5,213,004 | A | * | 5/1993 | Hoblingre ....................... 74/493 |
| 5,259,264 | A | * | 11/1993 | Bodin et al. ..................... 74/493 |
| 5,361,646 | A | * | 11/1994 | Venable ........................... 74/531 |
| 5,363,716 | A |  | 11/1994 | Budzik, Jr. et al. |
| 6,189,405 | B1 |  | 2/2001 | Yazane |
| 6,474,189 | B1 | * | 11/2002 | Koellisch et al. ............... 74/493 |
| 6,604,439 | B2 | * | 8/2003 | Gaukel ............................ 74/493 |
| 6,662,674 | B2 | * | 12/2003 | Cartwright et al. ............. 74/493 |
| 6,666,478 | B2 | * | 12/2003 | Livengood ..................... 280/775 |
| 6,688,644 | B2 | * | 2/2004 | Tsunoda et al. ............... 280/777 |
| 6,766,712 | B2 | * | 7/2004 | Koellisch et al. ............... 74/493 |
| 6,862,947 | B2 | * | 3/2005 | Cooper et al. .................. 74/493 |
| 7,584,996 | B2 | * | 9/2009 | Cartwright ..................... 280/775 |
| 2002/0020245 | A1 | * | 2/2002 | Gaukel ............................ 74/493 |
| 2003/0094061 | A1 | * | 5/2003 | Cartwright et al. ............. 74/493 |
| 2003/0145675 | A1 | * | 8/2003 | Hobaugh, II .................... 74/493 |
| 2004/0056466 | A1 | * | 3/2004 | Hobaugh, II .................. 280/775 |

(Continued)

FOREIGN PATENT DOCUMENTS

| EP | 1352806 | 10/2003 |
|---|---|---|
| EP | 1 400 430 A2 | 3/2004 |
| GB | 2 381 853 B | 8/2005 |
| JP | 2004210264 | 7/2004 |

*Primary Examiner* — Drew Brown
*Assistant Examiner* — Barry Gooden, Jr.
(74) *Attorney, Agent, or Firm* — Leydig, Voit & Mayer

(57) ABSTRACT

The steering column assembly has a base mounted to the machine and a steering column coupled to the base that pivots about the base at one end of the steering column. The steering column assembly has column plates and base plates with pinned ends and slotted ends. The pinned ends of the plates form pin openings. The column plates are pivotably coupled to the steering column with a column pin and the base plates are pivotably coupled to the base with a base pin. The column plates contact the base plates such that their respective slots intersect to form an opening through the slots. A locking pin fits in the opening and pushes the column plates against the base plates, creating friction between the plates that prevents the steering column from moving. When the locking pin is in an unlocked position the steering column is movable with at least two degrees of freedom. When the locking pin is in a locked position the steering column is not movable.

17 Claims, 7 Drawing Sheets

(56) References Cited

U.S. PATENT DOCUMENTS

| | | |
|---|---|---|
| 2005/0160863 A1* | 7/2005 | Matsumiya ................. 74/492 |
| 2006/0186658 A1* | 8/2006 | Yasuhara et al. ............ 280/775 |
| 2006/0267328 A1* | 11/2006 | Eggers et al. ............... 280/775 |
| 2007/0164549 A1* | 7/2007 | Bastein et al. .............. 280/777 |
| 2008/0231032 A1* | 9/2008 | Oh .............................. 280/775 |
| 2009/0151498 A1* | 6/2009 | Garbrecht et al. ........... 74/493 |
| 2011/0121553 A1* | 5/2011 | Battistella et al. .......... 280/779 |
| 2011/0239807 A1* | 10/2011 | Ridgway et al. ............. 74/493 |

\* cited by examiner

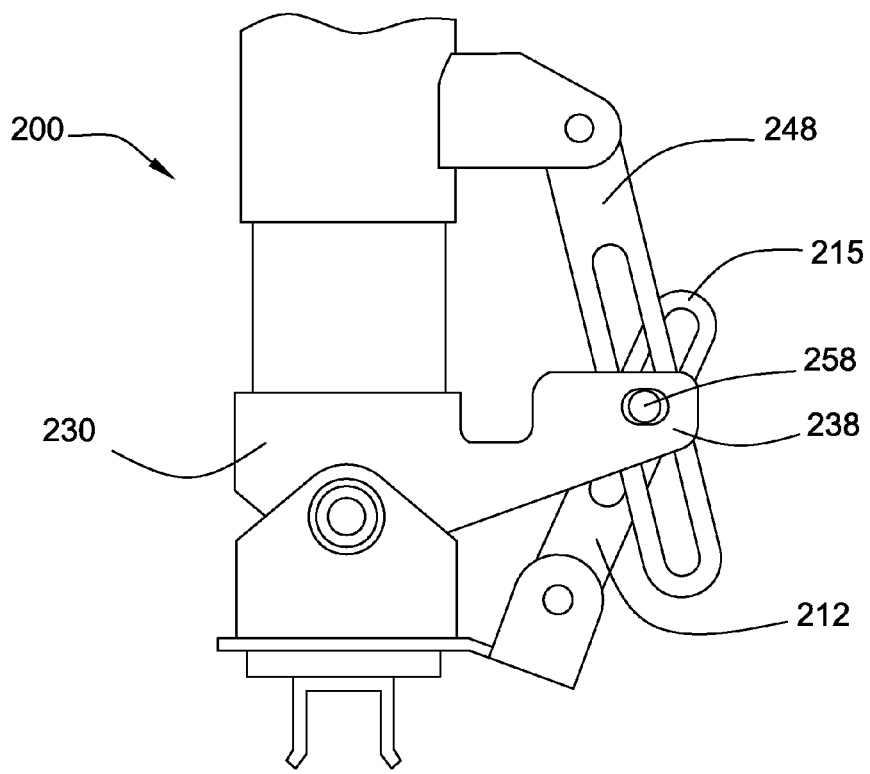
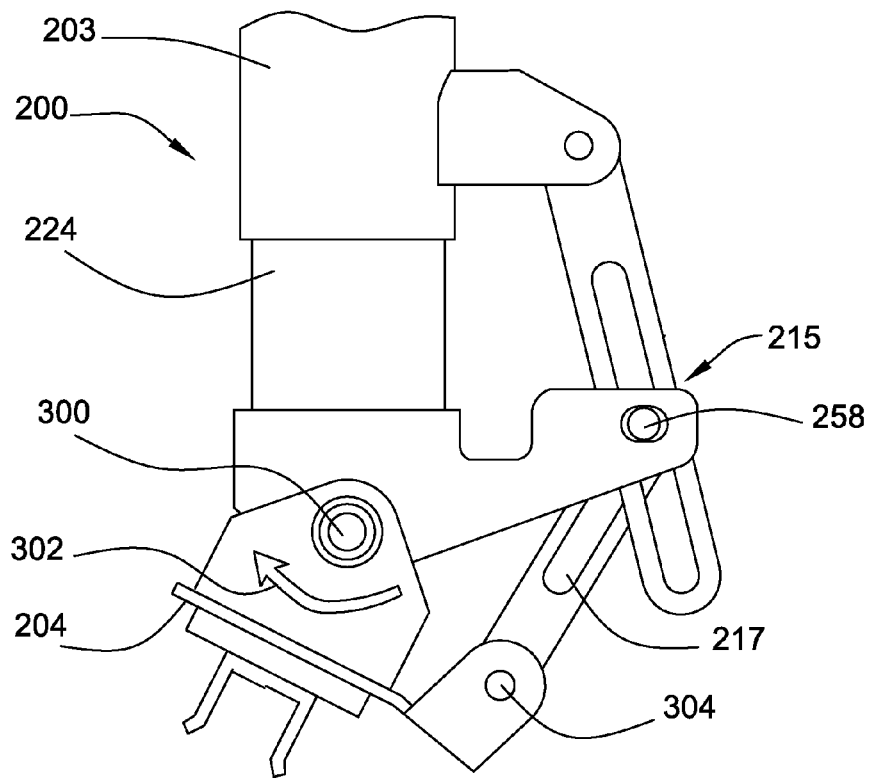

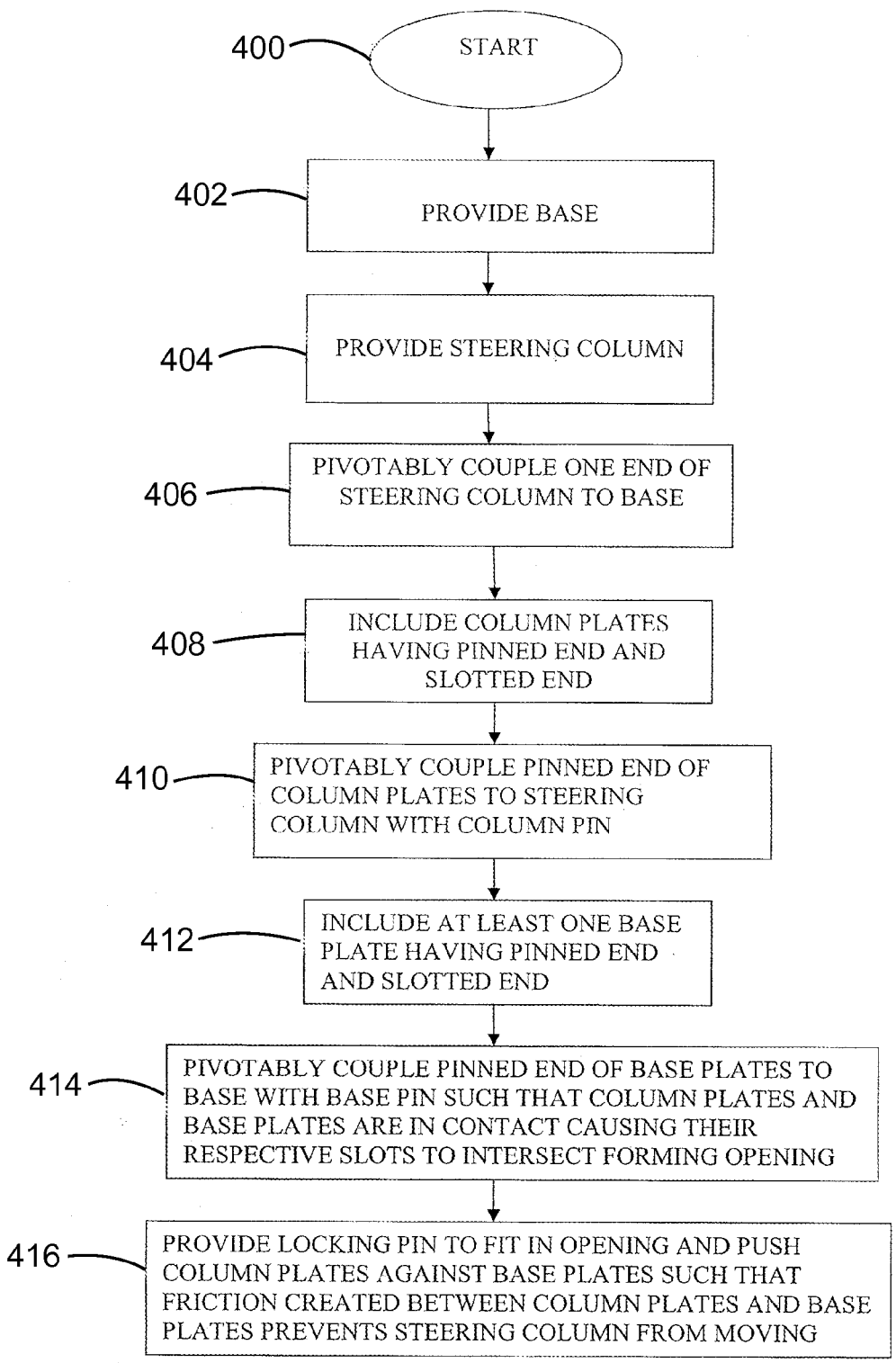

SINGLE POINT FRICTION LOCK FOR TILT AND TELESCOPE ADJUSTMENT OF STEERING COLUMNS

TECHNICAL FIELD

This patent disclosure relates generally to steering systems and components on a machine and, more particularly to an apparatus and method for a steering column that is movable by a machine operator.

BACKGROUND

Heavy machines are often used in construction, mining, and other industrial applications. Many of these machines are controlled by an operator using a steering wheel. In machines controlled using a steering wheel, the operator needs to adjust the steering wheel's position to comfortably and most effectively control the machine. Adjustable steering columns have been used in the past, but most have shortcomings. For example, the position of some steering columns can only be adjusted in discrete increments. Other designs include bulky adjustment mechanisms and require complicated linkages or have insufficient strength to handle heavy usage in large, off-road vehicles. Finally, some designs only move with one degree of freedom, limiting a user's ability to make adjustments.

SUMMARY

The disclosure describes, in one aspect, a machine steering column that can be adjusted with multiple degrees of freedom, has compact construction, and provides sufficient strength for use in heavy-duty, off-road vehicles. The steering column assembly has a base mounted on the machine, with a steering column connected to the base that pivots on one end with respect to the machine. Column plates are pinned to the steering column so that the column plates can pivot about one end. Base plates are pinned to the base so that the base plates can pivot about one end. Both the column plates and the base plates have slots, and the plates contact one another causing their respective slots to intersect and form an opening through the plates. A locking pin fits through the opening and pushes the plates together. When the plates are pushed together, friction between the plates prevents the steering column from moving relative to the machine. When the locking pin is in an unlocked position, the steering column can be moved relative to the machine with at least two degrees of freedom. When the lock pin is in a locked position, motion of the steering column relative to the machine is countered by the friction between the column and base plates.

BRIEF DESCRIPTION OF THE DRAWING(S)

FIG. 4 is a partial side view of the steering column assembly of FIG. 2.

FIG. 5 is a partial side view of the steering column assembly of FIG. 2 in a tilted position.

FIG. 10 is a flow chart illustrating a method of constructing the steering column assembly of FIG. 2.

DETAILED DESCRIPTION

Figure 1:
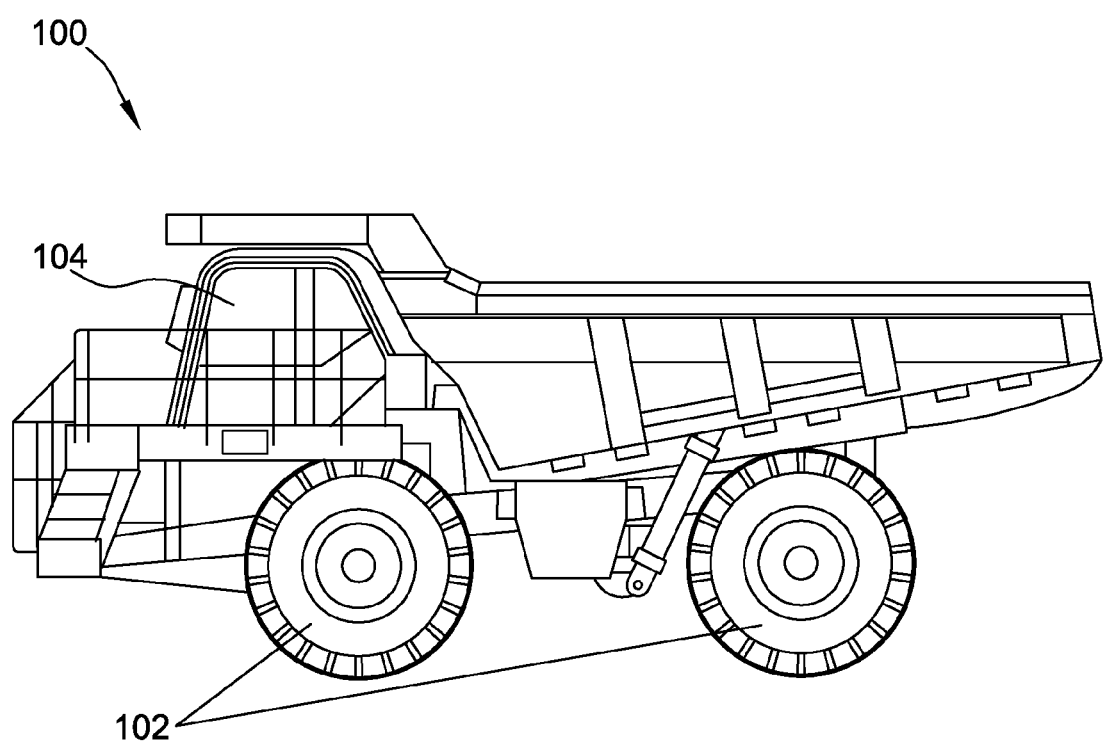
FIG. 1 is a side view of a machine in accordance with the disclosure.
Figure 2:
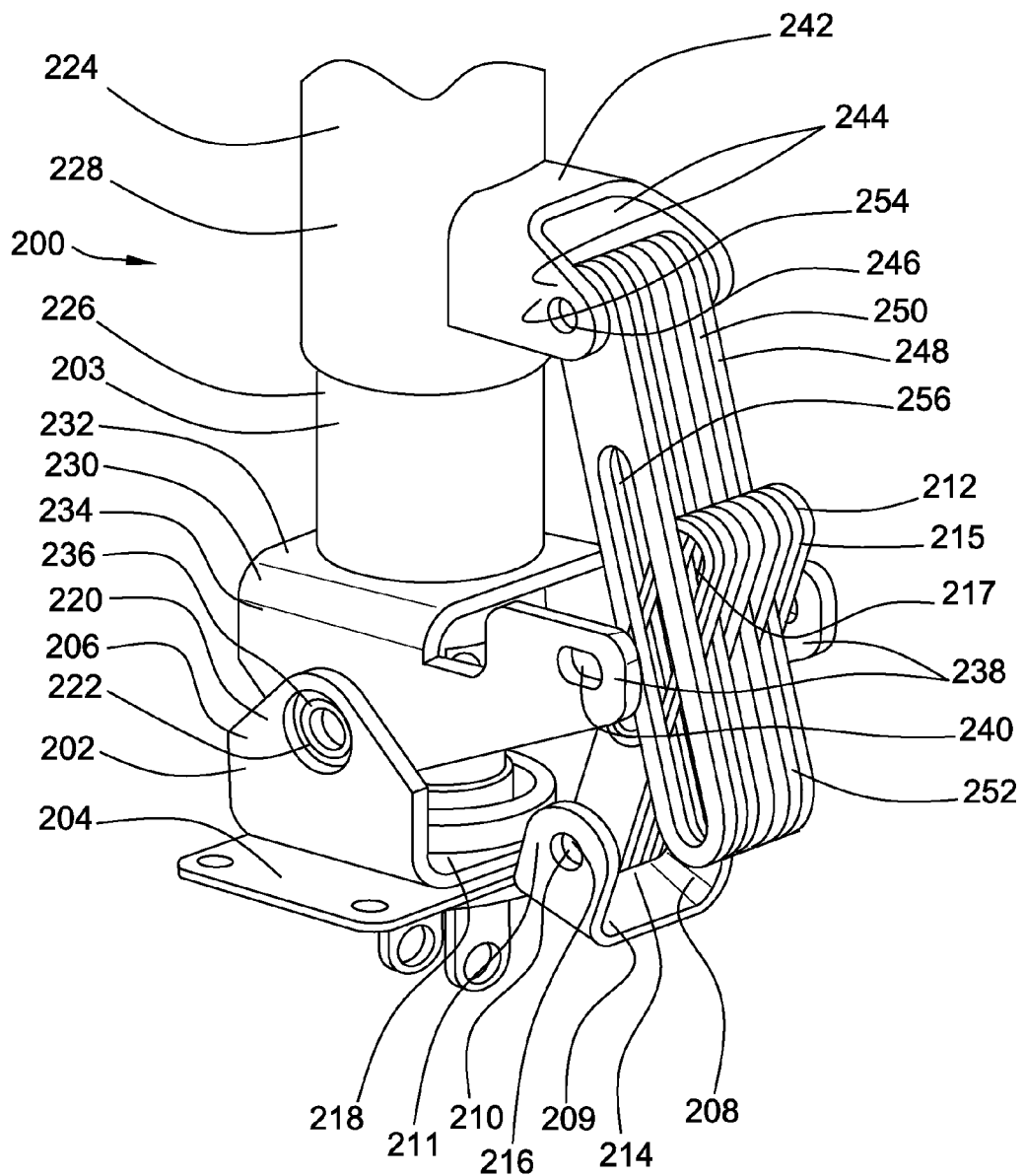
FIG. 2 is a partial perspective view of a steering column assembly in accordance with the disclosure.
Figure 3:
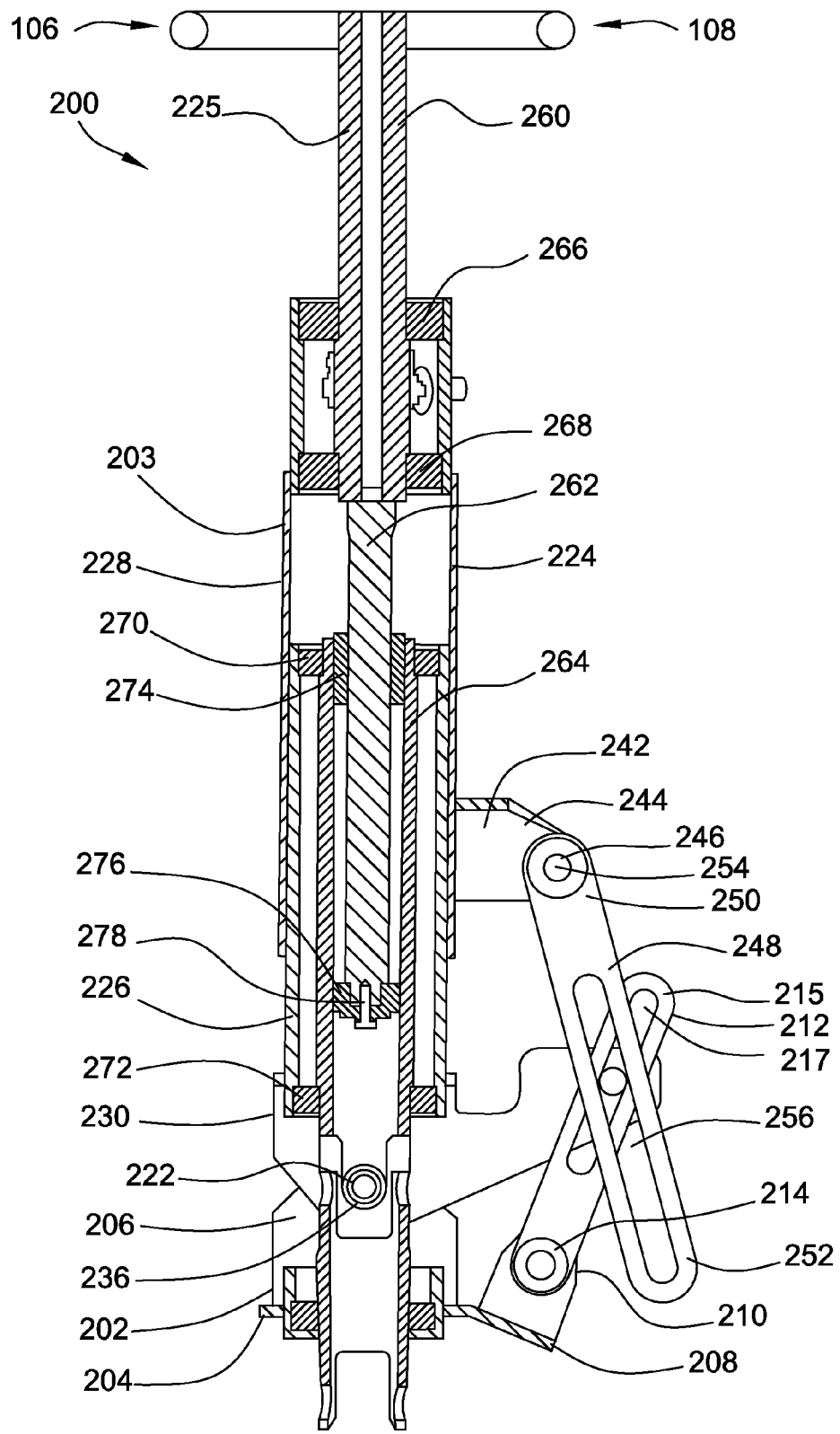
FIG. 3 is a cross-sectional view of the steering column assembly of FIG. 2.

This disclosure relates to a machine 100 having wheels 102, a cab 104 for an operator, a steering wheel assembly 108 with a steering wheel 106, and a steering column assembly 200. The steering wheel 106 connects to a steering column assembly 200 as shown in FIG. 2 and FIG. 3. An operator may use the steering wheel 106 to control the direction the machine's 100 travel. While the arrangement is illustrated in connection with an off-highway truck, the arrangement disclosed herein has universal applicability in various other types of machines. The term "machine" may refer to any machine that performs some type of operation associated with an industry such as mining, construction, farming, transportation, or any other industry known in the art. For example, the machine may be an earth-moving machine, such as a wheel loader, excavator, dump truck, backhoe, motor grader, material handler or the like. Moreover, an implement may be connected to the machine. Such implements may be utilized for a variety of tasks, including, for example, loading, compacting, lifting, brushing, and include, for example, buckets, compactors, forked lifting devices, brushes, grapples, cutters, shears, blades, breakers/hammers, augers, and others.

The steering column assembly 200 shown in FIG. 2 and FIG. 3 includes a base 202 and a steering column 203. The base 202 has a mounting bracket 204, a base bracket 206, and a base plate bracket 208. The mounting bracket 204 is connected to the machine 100 with bolts, by welding, or any other manner of fastening. The base plate bracket 208 is connected to the mounting bracket 204 at a waist portion 209 of the base plate bracket. Two parallel arms 211 protrude perpendicularly from the waist 209 and form pin holes 210 opposite one another at the distal ends of the arms. The two pin holes 210 line up to allow a base pin 304 to fit through both pin holes (see FIG. 5). The base bracket 206 also has a waist 218 and two parallel arms 220. The waist 218 is connected to the mounting bracket 204 by welding or any other fastening. Each of the arms 220 on the base bracket 206 forms bores 222 opposite one another.

The steering column 203 has a column housing 224, a column bracket 230, a steering column rod 225 and a column plate bracket 242. As shown in FIG. 2 and FIG. 3, the column housing 224 is made up of two tube-shaped sleeves—an inner sleeve 226 and an outer sleeve 228. The column housing 224 houses the steering column rod 225, which connects to a user-operated steering wheel 106. The inner sleeve 226 has an outer diameter that is slightly less than an inner diameter of the outer sleeve 228 allowing the inner sleeve to fit into the outer sleeve as shown in FIG. 3. This allows the column housing 224 to telescope in order to become shorter or longer.

The steering column rod 225 connects to the steering wheel 106 of the machine 100. When the machine 100 operator turns the steering wheel 106, the steering column rod 225 rotates within the column housing 224 and causes the wheels 102 of the machine to turn in the desired direction. As best seen in FIG. 3, the steering column rod 225 has a rod neck 260, a rod piston 262, and a rod cylinder 264. The rod neck 260 connects to a steering wheel assembly 108. Two gaskets, an upper outer sleeve gasket 266 and a lower outer sleeve gasket 268, secure the rod neck 260 within the outer sleeve 228. Two more gaskets, an upper inner sleeve gasket 270 and a lower inner sleeve gasket 272, secure the rod cylinder 264 within the inner sleeve 226. The rod neck 260 also connects to the rod piston 262, which fits inside of the rod cylinder 264. The rod neck 260 and the rod piston 262 are connected by welding or any other fastening method. A cylinder gasket 274 and a piston gasket 276 slidably secure the rod piston 262 within the rod cylinder 264. A piston bolt 278 secures the piston gasket 276 at one end of the rod piston 262. The cylinder gasket 274 and the piston gasket 276 allow the rod piston 262 to telescope within the rod cylinder 264 as necessary to adjust the steering wheel's 106 height. Although the steering rod 225 described is illustrated in FIG. 3, many other steering rod designs could be used within the steering column assembly 200.

One end of the inner sleeve 226 of the column housing 224 connects to the waist 232 of the column bracket 230. The column bracket 230 also has two parallel arms 234 protruding from two sides of the waist 232 in a direction away from the column housing 224. Each of the arms 234 forms bores 236 that corresponds with bores 222 on each arm 220 of the base bracket 206. The column bracket 230 and the base bracket 206 are aligned so fasteners (not shown) can fit through a bore 236 on each arm 234 of the column bracket and through a bore 222 on each arm 220 of the base bracket. As shown in FIGS. 4-8 and described below in greater detail, these fasteners allow the steering column 203 to pivot about the base 202 at a tilt pivot 300.

As shown in FIG. 2, the column bracket 230 additionally includes parallel fingers 238 that extend from each of the arms 234 of the column bracket in a direction substantially perpendicular and away from the column housing 224. Each of the fingers 238 forms pin holes 240 near its distal end. The pin holes 240 are aligned to allow a locking pin 258 to fit through both pin holes simultaneously.

The column plate bracket 242 connects to the surface of the outer sleeve 228 by welding or other fastening methods. The column plate bracket 242 includes two parallel arms 244 that protrude perpendicularly away from the column housing 224. The distal ends of each of the arms 244 forms a pin hole 246. The pin holes 246 are aligned to allow a column pin 310 to fit through both pin holes simultaneously.

Figure 9:
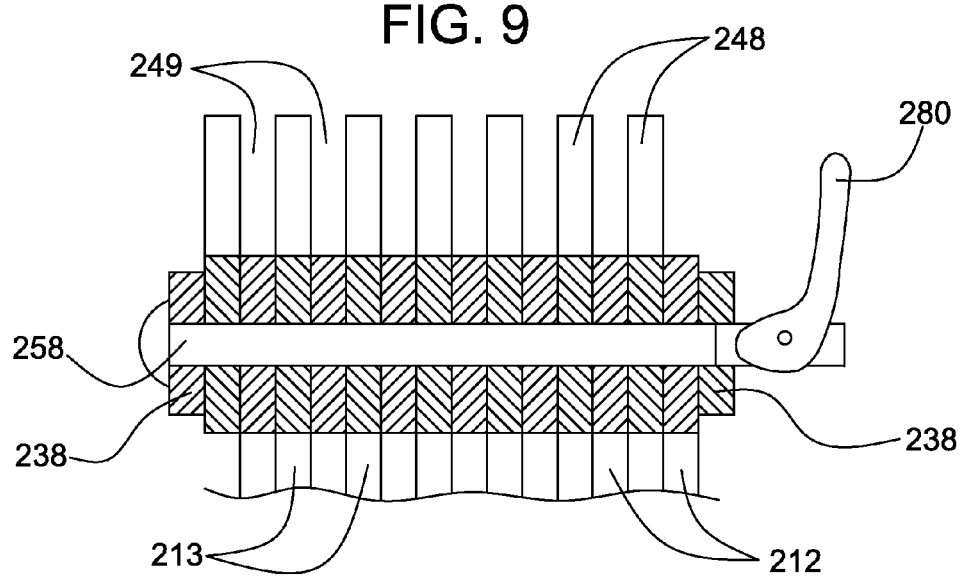
FIG. 9 is a sectional view of the locking pin of the steering column assembly of FIG. 2 shown in a locked position.

Column plates 248 having a pinned end 250 and a slotted end 252 are stacked between the two arms 244 of the column plate bracket 242 with a gap 249 between each column plate (see FIG. 9). The column plates 248 form pin openings 254 on their pinned ends 250 and slots 256 on their slotted ends 252. The pinned ends 250 of the column plates 248 are aligned between the arms 244 of the column plate bracket 242 allowing the column pin 310 to fit through the pin holes 246 of the column plate bracket's arms and the pin openings 254 of the column plates. The column pin 310 secures the column plates 248 to the column plate bracket 242 and the column plates pivot about the column pin and their pinned ends 250. FIG. 2 shows seven column plates 248, but any other number of column plates can be used.

Similarly, base plates 212 have pinned ends 214 that form pin openings 216 and slotted ends 215 that form slots 217. The pinned ends 214 of the base plates 212 are stacked between the arms 211 of the base plate bracket 208 with a gap 213 between each base plate. The base plates 212 are stacked to allow a base pin 304 to fit through the pin holes 210 in the base plate bracket 208 and the pin openings 216 in the base plates. The base pin 304 secures the base plates 212 to the base plate bracket 208 and the base plates pivot about the base pin about their pinned ends 214. FIG. 2 shows an embodiment using seven base plates 212, but any number of base plates can be used.

As best seen in FIG. 2, the slotted ends 215 of the base plates 212 contact and intersect the slotted ends 252 of the column plates 248 between the parallel fingers 238 of the column bracket 230. At this intersection, the column plates 248 and the base plates 212 create an alternating stack. The slots 217 on the base plates 212 and the slots 256 on the column plates 248 align with the pin holes 240 on the fingers 238 of the column bracket 230 to form an opening through which a locking pin 258 fits through all the pin holes and slots. This locking pin 258 holds the column plates 248 and base plates 212 alternately in place between the fingers 238.

The steering column assembly also features a locking lever 280 that connects to one end of the locking pin 258 shown in FIG. 9. Although FIG. 9 shows a cam-style locking lever 258, any type of locking lever can be used. When the locking lever 280 and locking pin 258 are in a locked position as illustrated, the locking lever presses the fingers 238 of the column bracket 230 toward one another, which presses the alternating column plates 248 and base plates 212 against one another. When pressed towards one another in the locked position, friction between the column plates 248 and the base plates 212 prevents the plates from sliding against one another. In this way, the stationary column plates 248 and base plates 212 prevent the steering column assembly 200 from moving relative to the machine 100. Depending on the application, some machines may require more frictional force than others to prevent the steering column 203 from moving. The frictional force created as the column plates 248 and base plates 212 press against one another varies based upon the size of the plates, the plates' coefficient of friction, the number of plates used, and the clamping force applied by the locking lever 280. Any variation of these parameters can be used to establish the frictional force that secures the steering column 203 for a given application and fits within/around the steering column assembly 200 in a machine 100.

To adjust the position of the machine's steering wheel 106 to a comfortable and usable position, the operator first moves the locking lever 280 from a locked position to an unlocked position. In an unlocked position, the locking lever does not press the column plates 248 and the base plates 212 toward one another. The friction between the column plates 248 and the base plates 212 is reduced, which enables the plates to slide against one another. When the column plates 248 and base plates 212 are able to move, the entire steering column 203 becomes movable. Once the machine operator moves the steering column 203 into the desired position, the operator moves the locking lever 280 from the unlocked position to the locked position. This presses the column plates 248 and the base plates 212 against one another securing the steering column 203 in the desired position.

Figure 6:
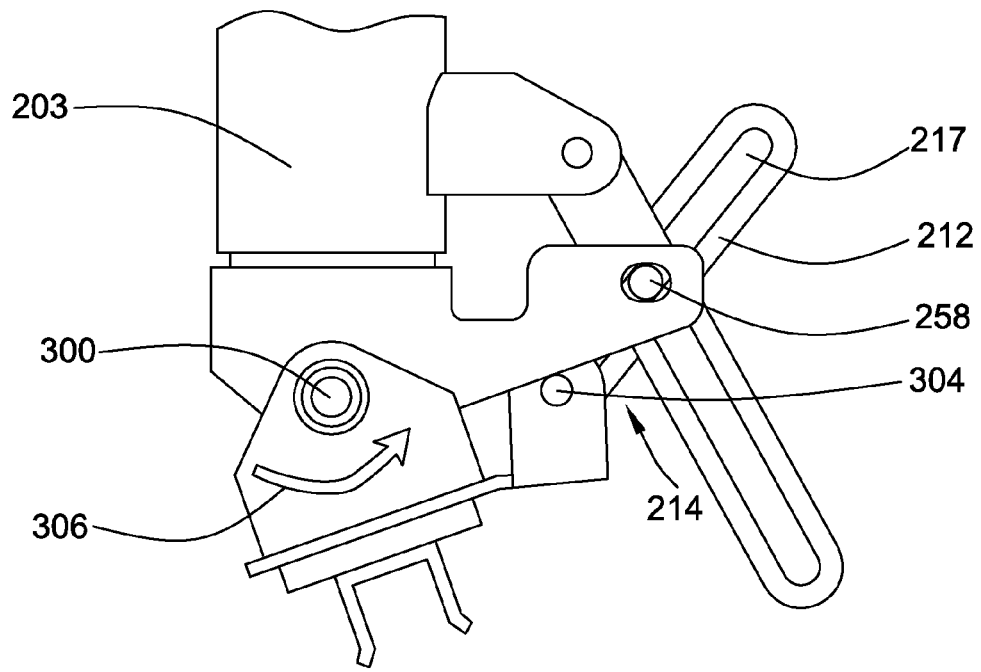
FIG. 6 is a partial side view of the steering column assembly of FIG. 2 in another tilted position.

FIGS. 4-8 illustrate the movements of the steering column assembly. Although the illustrated embodiments show a steering column 203 movable with two degrees of freedom, tilt and vertical, movement with additional degrees of freedom is possible in alternate embodiments not shown herein. FIG. 4 shows the steering column 203 in a neutral position. FIG. 5 and FIG. 6 illustrate the tilt movement of the steering column 203. While the mounting bracket 204 is affixed to the machine 100, FIG. 5 shows how the entire steering column 203 moves with respect to the machine by pivoting about a tilt pivot 300 when the locking lever 280 is in the unlocked position. Arrow 302 indicates this movement. When a machine operator tilts the steering column 203 about the tilt pivot 300 in the direction indicated by arrow 302, the base plates 212 pivot about the base pin 304. When the base plates move, the locking pin 258 slides within the slots 217 in the base plates. The steering column 203 can tilt in the direction indicated by arrow 302 until the locking pin 258 reaches the end of the slots 217 nearest the slotted ends 215 of the base plates 212, as shown in FIG. 5.

Similarly, as illustrated in FIG. 6, a machine operator can also tilt the steering column 203 about the tilt pivot 300 in the direction indicated by arrow 306 when the locking lever 280 is in the unlocked position. When the steering column 203 is tilted about the tilt pivot 300 in the direction indicated by arrow 306, the base plates 212 pivot about the base pin 304. When the base plates 212 move, the locking pin 258 slides within the slots 217 in the base plates. The steering column 203 can tilt in the direction indicated by arrow 306 until the locking pin 258 reaches the end of the slots 217 nearest the pinned end 214 of the base plates 212. This position is shown in FIG. 6. The steering column 203 can tilt over an infinite number of positions between, for example, the position described and shown in FIG. 5 and the position described and shown in FIG. 6.

Figure 7:
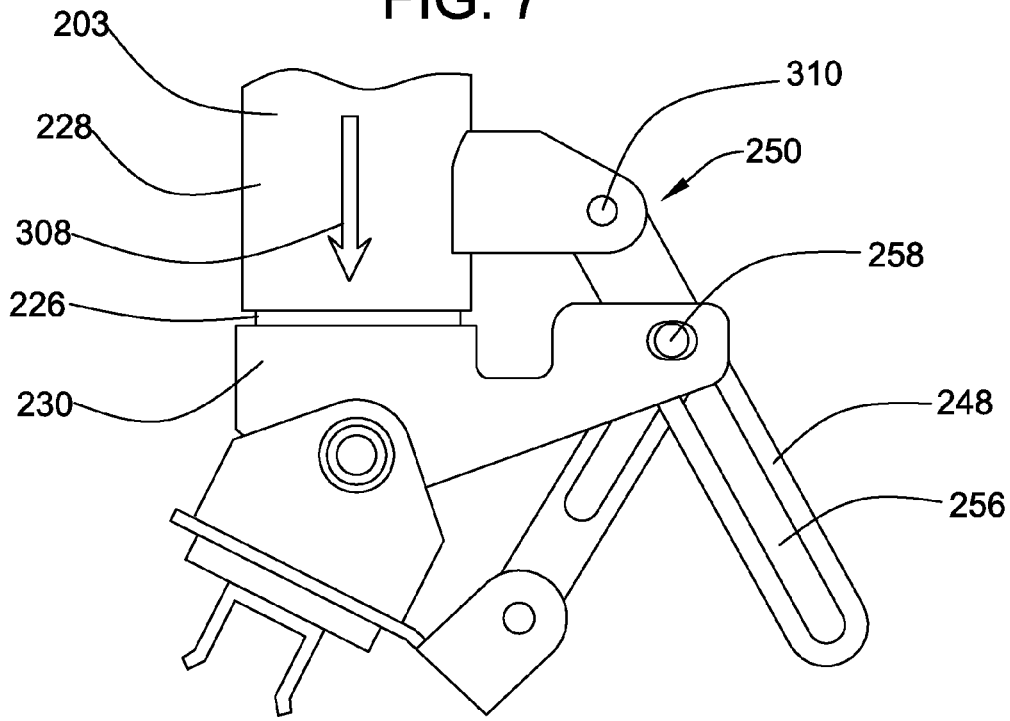
FIG. 7 is a partial side view of the steering column assembly of FIG. 2 in a lowered position.
Figure 8:
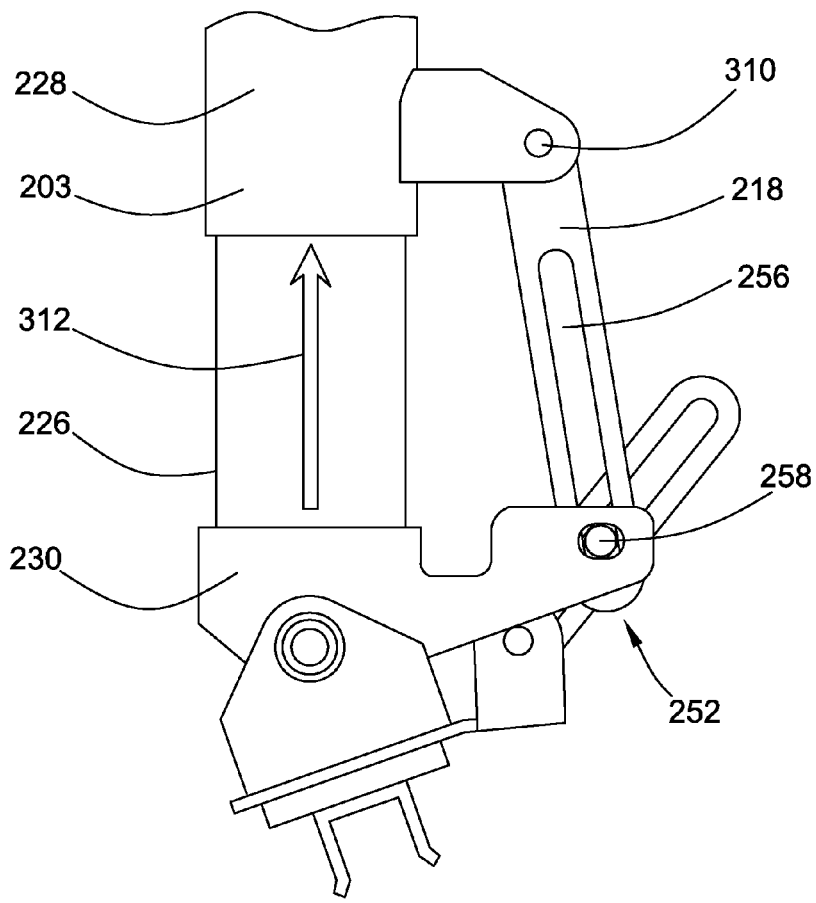
FIG. 8 is a partial side view of the steering column assembly of FIG. 2 in a raised position.

FIG. 7 and FIG. 8 illustrate the telescoping vertical movement of the steering column 203. When the locking lever 280 is in the unlocked position, the machine operator can raise or lower the steering wheel 106 as necessary. When the operator lowers the steering wheel 106, the outer sleeve 228 of the column housing 224 slides over the inner sleeve 226 towards the column bracket 230 in the direction indicated by arrow 308. When the outer sleeve 228 moves in the direction of arrow 308, the column plates 248 pivot about a column pin 310. When the column plates 248 move, the locking pin 258 slides within the slots 256 in the column plates. The machine operator can lower the steering wheel 106, causing the outer sleeve 228 to be lowered, in the direction indicated by arrow 308 until the locking pin 258 reaches the end of the slots 256 nearest the pinned end 250 of the column plates 248. This is the position shown in FIG. 7.

As illustrated in FIG. 8, the outer sleeve 228 of the column housing 224 also slides over the inner sleeve 226 away from the column bracket 230 in the direction indicated by arrow 312 when the locking lever 280 is in the unlocked position. This upward movement of the outer sleeve 228 occurs when the machine operator moves the steering wheel 106 in the direction indicated by arrow 312. When the outer sleeve 228 is moved in the direction indicated by arrow 312, the column plates 248 pivot about the column pin 310. When the column plates 248 move, the locking pin 258 slides within the slots 256 in the column plates. The machine operator can raise the steering wheel 106, causing the outer sleeve 228 to be raised, upwards in the direction indicated by arrow 312 until the locking pin 258 reaches the end of the slots 256 nearest the slotted end 252 of the column plates 248. This is the position shown in FIG. 8. This telescoping action of the outer sleeve 228 and inner sleeve 226 allows the machine operator to adjust the height of the steering wheel 106 to an infinite number of positions between, for example, the position described and shown in FIG. 7 and the position described and shown in FIG. 8.

The relationship described herein between the column plates 248, the base plates 212, and the locking pin 258 allows a machine operator to adjust the steering wheel 106 of a machine 100 with multiple degrees of freedom simultaneously. For instance, a machine operator can move the steering wheel 106 upwards or downwards while tilting the steering wheel at the same time. The operator need only move a single locking lever 280 from the locked position to the unlocked position, move the steering wheel 106 as desired, then move the locking lever 280 back into the locked position to prevent further movement.

Even though a machine operator can move the steering column 203 with multiple degrees of freedom, the locking mechanism in accordance with the disclosure has a relatively compact construction. Although the steering column assembly 200 is robust enough to be used in off-road and heavy-duty machines, it is also versatile enough to be used in any type of machine.

FIG. 10 is a flow chart for a method of constructing a steering column assembly 200. The method includes providing a base 402 and a steering column 404. One end of the steering column is pivotably coupled to the base 406. The steering column assembly 200 includes at least one column plate that has a pinned end and a slotted end 408. The method also includes pivotably coupling the pinned end of the column plates to the steering column with a column pin 410. The steering column assembly 200 is provided with at least one base plate 212 having a pinned end 214 and a slotted end 215 at 412. The pinned ends 214 of the base plates 212 are pivotably coupled to the base 202 with a base pin 304 at 414. The column plates 248 and the base plates are aligned causing their respective slots to intersect forming an opening. Finally, the method includes providing a locking pin 258 at 416 to fit in the opening and push the column plates 248 against the base plates 212. The friction created between the column plates 248 and the base plates 212 prevents the steering column from moving relative to the base 202 and the machine 100.

Industrial Applicability

The industrial application of the apparatus and methods for a movable steering column assembly in a machine as described herein should be readily appreciated from the foregoing discussion. The present disclosure is applicable to any type of machine controlled using a steering wheel. It is particularly useful when multiple operators regularly use a machine, such as on a construction, mining, or other industrial site. The steering wheel must be quickly and easily adjustable to accommodate each different operator, but still withstand the rigors of the particular application.

The disclosure, therefore, is applicable to many different machines and environments. One exemplary machine suited to the disclosure is an off-highway truck. These trucks are commonly used in mines, construction sites, and quarries. Off-highway trucks are subject to rugged, off-road terrain and their components must operate successfully under these conditions. The steering column in an off-highway truck must remain stationary so the operator can control the machine even when its experiences excessive vibration, bouncing, and other impact from the rough terrain. Thus, a steering column assembly that will allow an operator to adjust the steering wheel's position as needed, but also keep the steering wheel from moving during heavy duty operation, can benefit an off-highway truck.

Further, the apparatus and methods above can be adapted to a large variety of machines. For example, other types of industrial machines, such as backhoe loaders, compactors, feller bunchers, forest machines, industrial loaders, wheel loaders and many other machines can benefit from the methods and systems described.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

I claim:

1. A machine, comprising:
   a base disposed on the machine;
   a steering column pivotably coupled to the base at one end;
   at least one column plate having a pinned end forming a pin opening and a slotted end forming a slot, wherein the pinned end is pivotably coupled to the steering column with a column pin extending through the pin opening and a pin hole formed in the steering column;
   at least one base plate having a pinned end forming a pin opening and a slotted end forming a slot, wherein the pinned end is pivotably coupled to the base with a base pin extending through the pin opening and a pin hole formed in the base;
   wherein the at least one column plate contacts the at least one base plate such that the respective slots in the at least one base plate and the at least one column plate intersect to form an opening therethrough;
   a locking pin disposed to fit in the opening and configured to push the at least one column plate against the at least one base plate creating a friction force between the at least one column plate and the at least one base plate that prevents the steering column from moving relative to the machine; and
   a column bracket disposed on the steering column that secures the locking pin relative to the steering column;
   wherein the steering column is movable with at least two degrees of freedom relative to the machine when the locking pin is in an unlocked position, and wherein the steering column is not movable relative to the machine when the locking pin is in a locked position.

2. The machine of claim 1, wherein the steering column further comprises multiple sleeves that slidably fit within one another to lengthen and shorten the steering column.

3. The machine of claim 1, wherein the column bracket is pivotably connected to the base.

4. The machine of claim 1, wherein the steering column further comprises a column plate bracket disposed on the steering column that secures the column pin relative to the steering column.

5. The machine of claim 1, wherein the base further comprises a base plate bracket disposed on the base that secures the base pin relative to the base.

6. The machine of claim 1, wherein:
   the locking pin includes a locking lever; and
   wherein the steering column is movable with respect to the machine when the locking lever is in an unlocked position, and wherein the steering column is unmovable with respect to the machine when the locking lever is in a locked position such that the locking lever pushes the at least one base plate against the at least one column plate.

7. The machine of claim 1, wherein the steering column further comprises a column housing including an outer sleeve and an inner sleeve.

8. The machine of claim 7, wherein the outer sleeve has an inner diameter slightly larger than an outer diameter of the inner sleeve allowing the inner sleeve to fit inside of the outer sleeve so the steering column can telescope to become longer and shorter.

9. The machine of claim 7, wherein:
   the steering column further comprises a column plate bracket disposed on the outer sleeve, the column plate bracket forming the pin holes in the steering column; and
   wherein the column pin extends through the pin holes to pivotably connect the at least one column plate to the outer sleeve.

10. A steering column assembly, comprising:
    a base;
    a steering column pivotably coupled to the base at one end;
    at least one column plate having a pinned end forming a pin opening and a slotted end forming a slot, wherein the pinned end is pivotably coupled to the steering column with a column pin extending through the pin opening and a pin hole formed in the steering column;
    at least one base plate having a pinned end forming a pin opening and a slotted end forming a slot, wherein the pinned end forms a pin opening and is pivotably coupled to the base with a base pin extending through the pin opening and a pin hole formed in the base;
    wherein the at least one column plate contacts the at least one base plate such that the respective slots in the at least one base plate and the at least one column plate intersect to form an opening therethrough;
    a locking pin disposed to fit in the opening and configured to push the at least one column plate against the at least one base plate creating a friction force between the at least one column plate and the at least one base plate that prevents the steering column from moving relative to the base; and
    a column bracket disposed on the steering column that secures the locking pin relative to the steering column;
    wherein the steering column is movable with at least two degrees of freedom relative to the base when the locking pin is in an unlocked position, and wherein the steering column is not movable relative to the base when the locking pin is in a locked position.

11. The steering column assembly of claim 10, wherein the steering column further comprises multiple sleeves that slidably fit within one another to lengthen and shorten the steering column.

12. The steering column assembly of claim 10, wherein the steering column further comprises a column plate bracket disposed on the steering column that secures the column pin relative to the steering column.

13. The steering column assembly of claim 10, wherein the base further comprises a base plate bracket disposed on the base that secures the base pin relative to the base.

14. The steering column of claim 10, wherein:
    the locking pin includes a locking lever; and
    wherein when the locking lever is in the unlocked position the steering column is movable with respect to the base, and when the locking lever is in the locked position the locking lever pushes the at least one base plate against the at least one column plate making the steering column unmovable with respect to the base.

15. The steering column assembly of claim 10, wherein the steering column further comprises a column housing with an outer sleeve and an inner sleeve.

16. The steering column assembly of claim 15, wherein the outer sleeve has an inner diameter slightly larger than an outer diameter of the inner sleeve allowing the inner sleeve to fit inside of the outer sleeve so the steering column can telescope to become longer and shorter.

17. The steering column assembly of claim 16, wherein:
the steering column further comprises a column plate bracket disposed on the outer sleeve, the column plate bracket forming the pin holes in the steering column; and
wherein the column pin extends through the pin holes to pivotably connect the at least one column plate to the outer sleeve.

\* \* \* \* \*

UNITED STATES PATENT AND TRADEMARK OFFICE
CERTIFICATE OF CORRECTION

| | | |
|---|---|---|
| PATENT NO. | : 8,523,227 B2 | Page 1 of 1 |
| APPLICATION NO. | : 12/966433 | |
| DATED | : September 3, 2013 | |
| INVENTOR(S) | : Keegan Roach | |

It is certified that error appears in the above-identified patent and that said Letters Patent is hereby corrected as shown below:

In the Specification,

Column 6, line 31, delete "Industrial Applicability" and insert -- INDUSTRIAL APPLICABILITY --, therefor.

Signed and Sealed this
Eighteenth Day of August, 2015

Michelle K. Lee
*Director of the United States Patent and Trademark Office*